United States Patent [19]

Feinland et al.

[11] Patent Number: 5,172,783
[45] Date of Patent: Dec. 22, 1992

[54] WEIGHING SCALE WITH VALIDATING REFERENCE CHANNEL

[75] Inventors: Seymour Feinland, Stamford; Gerald C. Freeman, Norwalk, both of Conn.

[73] Assignee: Pitney Bowes, Inc., Stamford, Conn.

[21] Appl. No.: 724,304

[22] Filed: Jul. 1, 1991

[51] Int. Cl.⁵ ............................................ G01G 23/10
[52] U.S. Cl. .................................... 177/185; 177/200
[58] Field of Search .............................. 177/185, 200

[56] References Cited

U.S. PATENT DOCUMENTS

| | | | |
|---|---|---|---|
| 4,212,361 | 7/1980 | Stocker | 177/200 |
| 4,347,903 | 9/1982 | Yano et al. | 177/185 X |
| 4,396,080 | 8/1983 | Dee | 177/185 |
| 4,553,619 | 11/1985 | Fujinaga | 177/185 |
| 4,593,778 | 6/1986 | Konishi et al. | 177/185 |
| 4,624,331 | 11/1986 | Naito | 177/185 |
| 4,751,973 | 6/1988 | Freeman et al. | 177/185 X |
| 4,926,359 | 5/1990 | Konishi et al. | 364/567 |
| 5,050,693 | 9/1991 | Wirth et al. | 177/200 |
| 5,117,929 | 6/1992 | Nakamura et al. | 177/185 |

*Primary Examiner*—Joseph W. Hartary
*Assistant Examiner*—Randy W. Gibson
*Attorney, Agent, or Firm*—Robert H. Whisker; Melvin J. Scolnick

[57] ABSTRACT

An electronic scale for weighing an article includes a weighing channel for providing an output indicative of the instantaneous weight of the article and a reference channel for providing an output indicative of instantaneous vibrations affecting the output of the weighing channel. The scale also has a mechanism for providing a signal indicative of a long term average of the reference channel's output. Another mechanism of the scale compares the average signal with the reference channel's output and provides a validation signal when the reference channel's output does not differ by more than a threshold amount from the average signal.

20 Claims, 8 Drawing Sheets

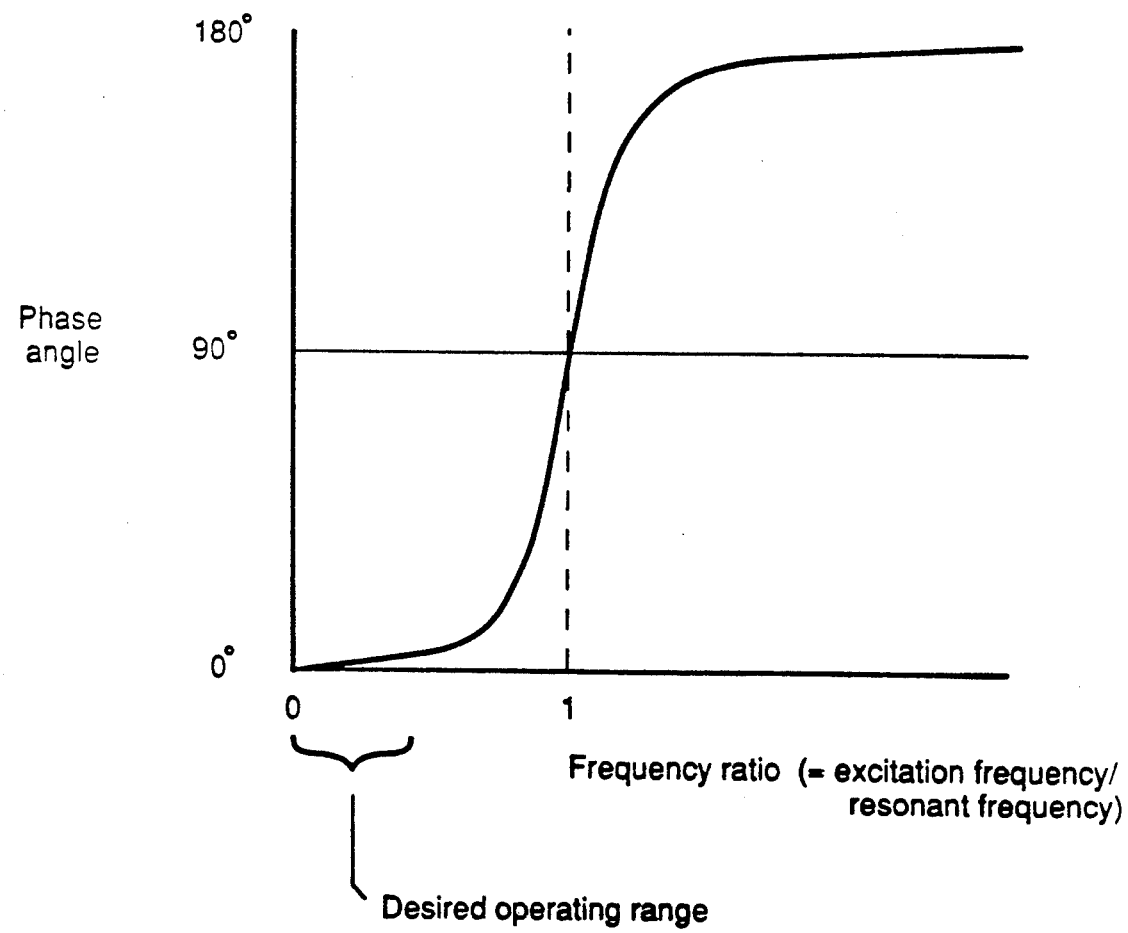
FIG. 1-A

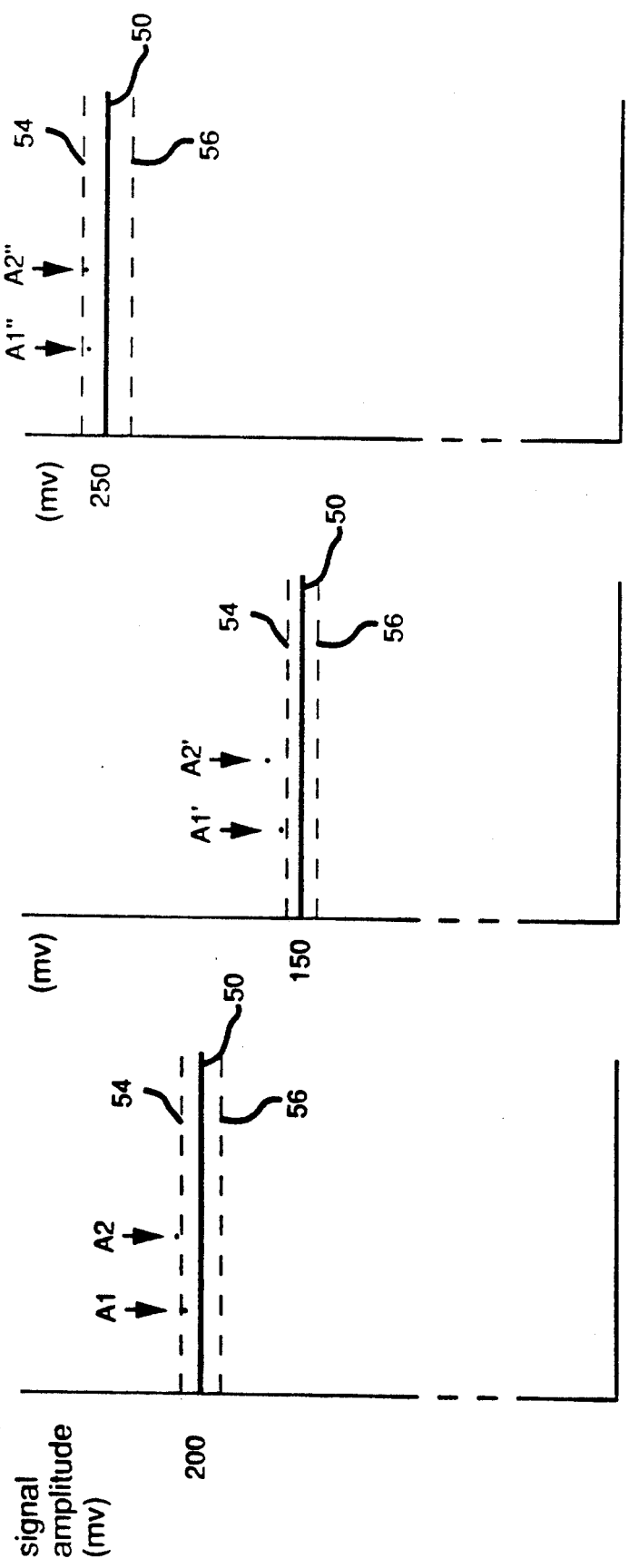

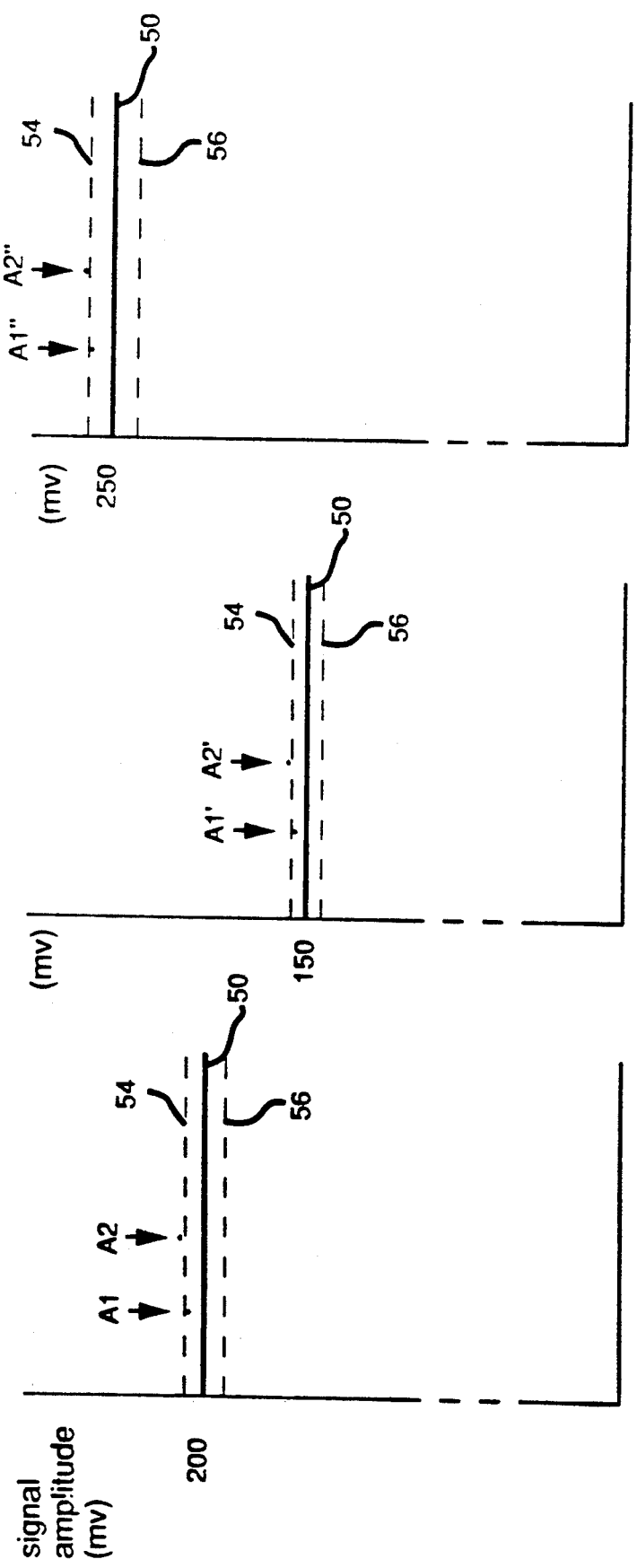
FIG. 3-D  FIG. 3-E  FIG. 3-F

WEIGHING SCALE WITH VALIDATING REFERENCE CHANNEL

FIELD OF THE INVENTION

The invention relates to electronic weighing scales and, more particularly, to scales that are to be operated in an environment in which vibrations are present.

BACKGROUND OF THE INVENTION

Ground vibration transmitted by a surface on which a scale is supported can adversely affect the accuracy of the scale's reading. Scales which use force-sensing transducers, as opposed to mass sensors, are especially prone to this problem. The most common types, including strain gage load cells, are force sensors. It is customary to use low pass filtering techniques to minimize the effects of higher frequency vibrations. However, the effects of vibrations in the frequency range of about 10 Hz or less cannot be satisfactorily attenuated by low pass filtering without greatly increasing the response time of the scale. The increase in response time is unacceptable in many applications, such as postal/shipping scales, in which high throughput is desired.

It is also known to use digital averaging to mitigate the effects of ground vibration but again response time constraints limit the effectiveness of this technique.

It has been proposed to provide, in addition to an article weighing mechanism, a second, or reference, weighing channel. For example, in U.S. Pat. No. 4,751,973, entitled "Load Cell Scale with Reference Channel for Live Load Correction," issued to Freeman et al. and assigned to the assignee of this application, a reference load cell and the primary weighing load cell are mounted in proximity to each other so as to be similarly affected by external vibrations. The output of the reference load cell is averaged over time and a correction term is obtained by dividing that average by the instantaneous output of the reference load cell. The correction term is then applied to the instantaneous output of the weighing channel to compensate for the instantaneous effect of ground vibration. The disclosure of U.S. Pat. No. 4,751,973 is incorporated herein by reference.

Other, more complex approaches to vibration compensation, also using reference channels, are described in references summarized in U.S. Pat. No. 4,751,973. Among these are U.S. Pat. No. 4,624,331 issued to Naito.

While many of these approaches have value, it is desirable to find additional approaches to achieve certain desired cost, response time and accuracy objectives.

SUMMARY OF THE INVENTION

According to the invention, an electronic scale for weighing an article includes: a housing; a weighing channel disposed within the housing for providing an output indicative of the instantaneous weight of the article; a reference channel disposed within the housing for providing an output indicative of instantaneous vibrations affecting the output of the weighing channel; a first mechanism connected to the reference channel for providing a first signal indicative of a long term average of the output of the reference channel; and a second mechanism connected to the first mechanism and the reference channel for comparing the first signal with the output of the reference channel and for outputting a validation signal when the output of the reference channel does not differ by more than a threshold amount from the first signal.

BRIEF DESCRIPTION OF THE DRAWINGS

FIG. 1-A shows the relationship of phase angle to frequency ratio for load cells that are part of the weighing scale of FIG. 1.

FIGS. 3-A, 3-B, 3-C illustrate the effect of zero shift on the operation of the module of FIG. 2.

FIGS. 3-D, 3-E, 3-F the effect of gain shift on the operation of the compare module.

DETAILED DESCRIPTION OF THE PREFERRED EMBODIMENTS

Figure 1:
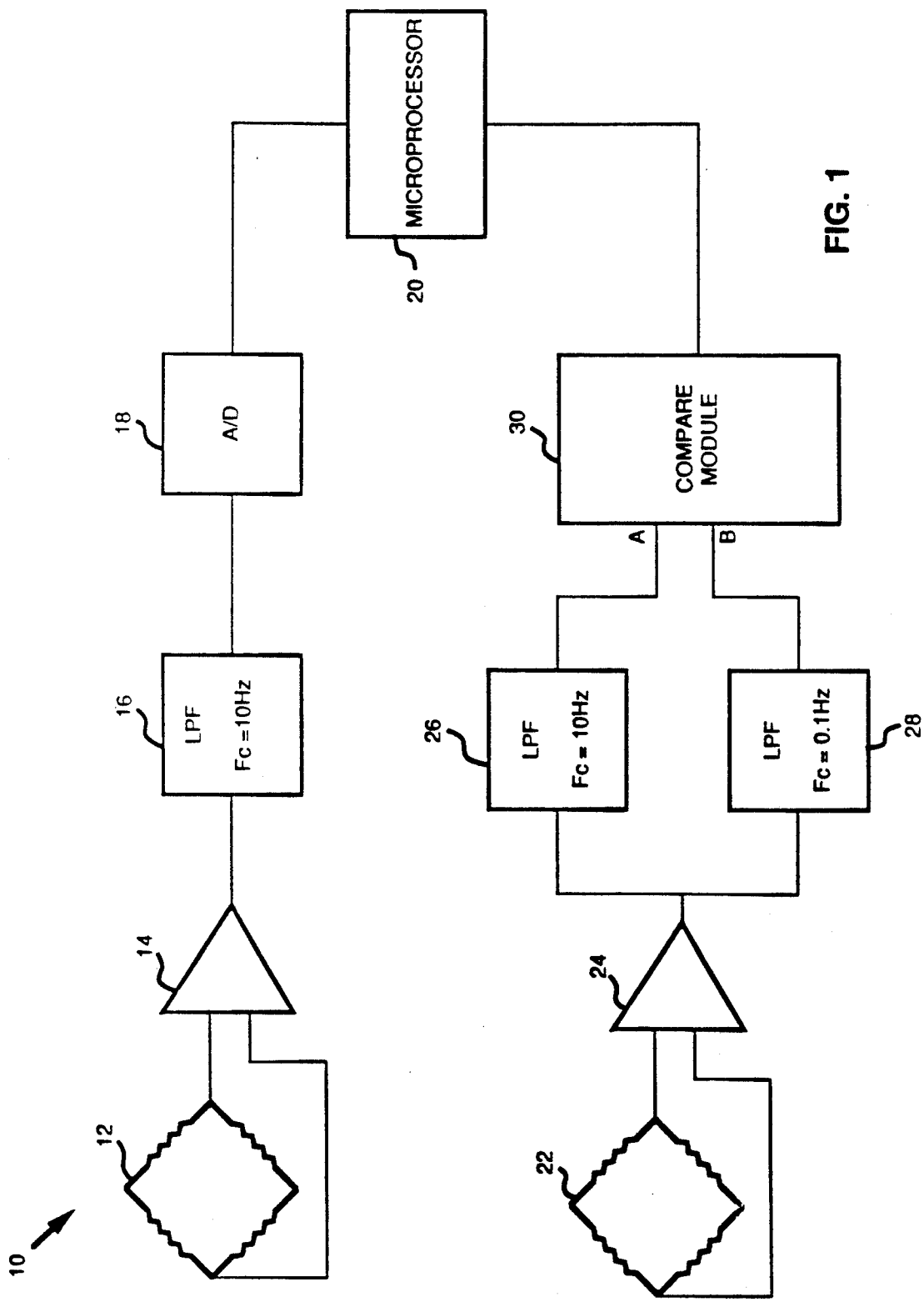
FIG. 1 is a block diagram of a weighing scale in accordance the invention.

FIG. 1 is a block diagram of a weighing scale 10. Scale 10 includes a weight sensing device which may, for example, be a conventional load cell 12 having strain gauges arranged as a Wheatstone bridge. An article to be weighed (not shown), such as a letter or parcel, is applied by conventional means (not shown) to the load cell, as, for instance, by placing the article on a pan supported by load cell 12. Load cell 12 is electrically excited by conventional means (not shown), and the output signal of load cell 12, reflecting the instantaneous apparent weight of the article, is received by preamplifier 14. The output of preamplifier 14 is connected to low pass filter 16, which preferably has a relatively low cut off frequency, such as 10 Hz. The filtered signal output by filter 16 is applied to analog to digital (A/D) converter 18. A/D converter 18 converts the filtered signal into a digital signal or count, which again represents the instantaneous weight of the article, subject to the effects of filter 16. The digital count output of A/D converter 18 is received by microprocessor 20, which processes the count for such purposes as displaying a metric or avoirdupois representation of the article's weight, calculating a postal or shipping charge for the article, etc. Load cell 12, preamp 14, filter 16, A/D converter 18 and microprocessor 20 and the interconnections therebetween will sometimes hereinafter collectively be referred to as a "weighing channel" and are all well known and readily realized as a conventional electronic scale.

Scale 10 also includes a second, reference, weight sensing device, such as load cell 22. Load cell 22 is preferably a conventional load cell, which, for reasons that will be discussed below, has a relatively small load capacity and is rather inexpensive as compared to primary load cell 12. Alternatively, instead of reference load cell 22, scale 10 could include an accelerometer capable of measuring acceleration at least from D.C. to about 50 Hz. Such an accelerometer could be mounted, for example, on the mechanical ground of weighing load cell 12. Another type of device that could be substituted for reference load cell 22 is a micro machined silicon sensor of the type designed as an accelerometer or load cell per se.

As discussed in above cited Pat. No. 4,751,973, scale 10 is arranged so that ground vibrations affecting load cell 12 have a like effect on load cell 22. For example load cell 22 may be arranged so its sensitivity to vibration is in the same direction as load cell 12; and load cell 22 is preferably located as close as feasible to the center of mass of load cell 12. A constant force, provided by a permanently affixed weight, is applied to load cell 22, which is conventionally excited. The output of load cell 22 is amplified by preamplifier 24, which like load cell 22 need not be particularly stable. The amplified signal output by preamp 24 is applied both to low pass filter 26 and to low pass filter 28. As will be appreciated by those skilled in the art, even though a constant weight is applied to load cell 22, the instantaneous output of load cell 22 (and preamp 24) will fluctuate under the influence of ground vibration just as will the outputs of primary load cell 12 and preamp 14. Like filter 16, filter 26 filters out high frequency vibration effects, but the output of filter 26 will reflect lower frequency vibration. It is advisable to closely match filter 26 to filter 16 so that the effects of ground vibration on the output of filter 26 are in synchronism with vibration effects on the output of filter 16. Load cell 22, preamp 24, filter 26, filter 28 and the connections therebetween will sometimes be collectively referred to as a "reference channel."

The respective resonant frequencies of load cells 12 and 22 with their associated tare structures, should be significantly above the 10 Hz cutoff frequency of filters 16 and 26 in order to assure that both the weighing and reference channels are in phase with each other when excited by low frequency ground vibration. Preferably, the resonant frequencies should exceed 30 Hz. For a system with moderately low damping, say less then 10% of critical, FIG. 1-A illustrates the relationship of phase angle to the frequency ratio of excitation frequency to resonant frequency. As is known by those skilled in the art, many conventional load cells exhibit damping of about 3% of critical. Reference is made to pages 120-121 of *Mechanical Vibrations* by Austin H. Church, at which there is a discussion of the relationship of phase angle to frequency ratio.

As will be apparent to those skilled in the art, the components making up the weighing channel and the reference channel may conveniently be disposed in a conventional scale housing (not shown).

Filter 28, by contrast with filter 26, is selected to have a very low cut off frequency; 0.1 Hz is a preferred value. The output of filter 28 will accordingly be a long term average of the output of filter 26 and will be essentially constant over time periods of interest. The output signals of filters 26 and 28 are respectively applied to inputs A and B of compare module 30. Compare module 30 compares the output signals of filters 26 and 28 and provides a signal to microprocessor 20 when those output signals are within a threshold amount of each other. The preferred form of the threshold amount is one which is based on a fixed percentage of the signal on terminal B. The signal size of the reference channel is then immaterial to its performance, and so too are the load cell sensitivity and the gains of the preamp and filters. Also, offsets of filters 26 and 28 do not require tight matching. Likewise temperature coefficients of resistance for these items, which would determine drifts, can be very coarse. The alternative, based on a fixed thresholds, would require more costly and complex reference channel load cell and electronics.

Figure 2:
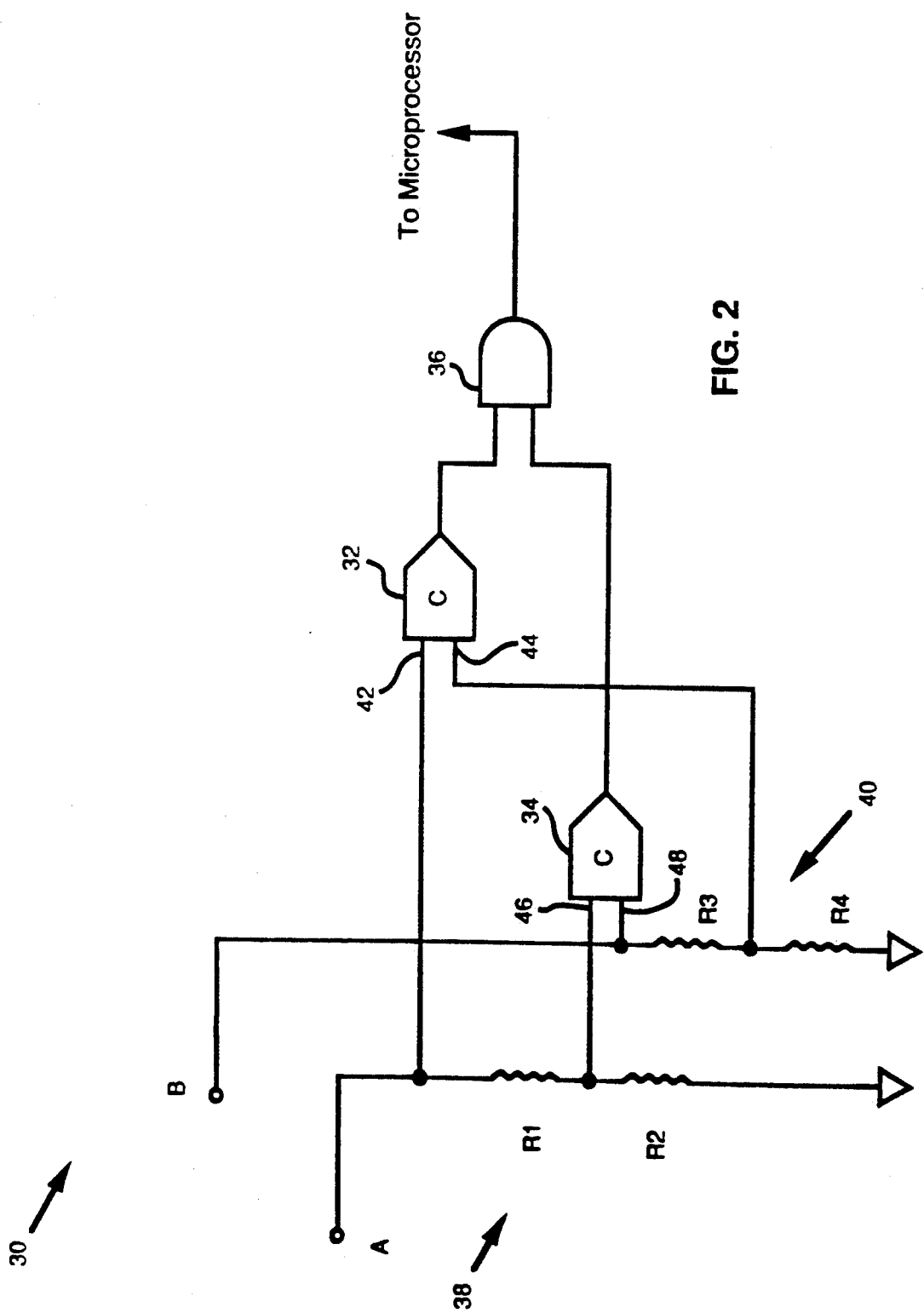
FIG. 2 is a schematic drawing of circuitry that makes up a compare module that is part of the scale of FIG. 1.

FIG. 2 shows in schematic form a preferred embodiment of compare module 30. Module 30 includes input terminals A and B which are respectively connected to the outputs of filters 26 and 28. Thus terminal A receives a signal representing the instantaneous effect of ground vibrations on the output of the weighing channel, and terminal B receives a long term average of the reference channel, reflecting a reference reading that can be considered free of the effects of ground vibration.

Module 30 includes comparators 32 and 34 and AND gate 36. Module 30 also includes resistors R1 and R2 which make up voltage divider 38, connected to terminal A. Also included in module 30 are resistors R3 and R4 which make up voltage divider 40, connected to terminal B.

Comparator 32 has inputs 42 and 44. Input 42 is connected directly to terminal A. Input 44 is connected to terminal B through voltage divider 40 and therefore receives a signal that is a fraction of the long term average signal received at terminal B. Comparator 32 is of the type that outputs a logic high if and only if the voltage appearing on input 42 equals or exceeds the voltage appearing on input 44.

Comparator 34 has inputs 46 and 48. Input 48 is connected directly to terminal B. Input 46 is connected to terminal A through voltage divider 38 and therefore receives a signal that is a fraction of the instantaneous vibration reference signal received at terminal A. Comparator 34 is of the type that outputs a logic high if and only if the voltage appearing on input 48 equals or exceeds the voltage appearing on input 46.

The respective outputs of comparators 32 and 34 are connected to the inputs of AND gate 36. AND gate 36 outputs a logic high if and only if a logic high is simultaneously received on both of its inputs. The output of AND gate 36 is received by microprocessor 20.

It will be recognized by those skilled in the art that a threshold amount may be established by selection of appropriate selection of the values of resistors R1, R2, R3 and R4 such that AND gate 36 outputs a logic high if and only if the signal on terminal A does not differ from the signal on terminal B by more than the threshold amount. The threshold amount will be a constant fraction of the signal on terminal B.

For example, suppose it is desired that AND gate 36 output a logic high only when the signal on terminal A differs from the signal on terminal B by no more than 0.1% of the signal on terminal on signal B. In that case the values of resistors R1, R2, R3 and R4 are selected so that the ratio of R2 to R1, and of R4 to R3, is 1000:1.

While comparator module 30 as shown in FIG. 2 includes an AND gate, it will be appreciated that alternative configurations, using an OR gate for example, are also possible.

Operation of scale 10 and compare module 30 are further described with reference to FIG. 3. Horizontal line 50 represents the signal on terminal B, which is essentially constant over time. Undulating line 52 represents the signal on terminal A, which fluctuates over time because of ground vibrations that affect the output of load cell 22, preamp 24 and filter 26. Dashed lines 54 and 56 together define a threshold around line 50. Assuming that R1, R2, R3 and R4 are chosen so that the ratio of R2 to R1, and of R4 to R3, is 1000:1, one may consider line 54 to be displaced above line 50, and line 56 to be displaced below line 50, by a distance equal to 0.1% of the constant amplitude represented by line 50.

Intervals V are examples of time periods during which the signal on terminal A does not differ from the signal on terminal B by more than 0.1% of the signal on terminal B. Intervals I are examples of periods during which the signal on terminal A does differ from the signal on terminal B by more than 0.1%. As discussed above, AND gate 36 outputs a logic high to microprocessor 20 during the time periods of which intervals V are examples. During these periods, ground vibration affects the output of the reference channel by less than 0.1%, and because of the construction of scale 10, the output of the weighing channel is also known to be affected by less than 0.1%. Microprocessor may therefore consider the output of the weighing channel to be "valid", at least insofar as ground vibration is concerned, when the logic high is received from AND gate 36. The logic high signal of AND gate 36 accordingly may be considered a validation signal. Upon receipt of the validation signal microprocessor 20 proceeds to process the signal received from A/D converter 18 by, e.g., translating it into weight units, displaying the weight of the article, calculating a postal charge for the article, etc.

An advantage of scale 10 is that drift in the output of load cell 22 or changes over time in the gain provided by preamp 24 will not adversely affect the functioning of scale 10, since any such changes will have the same effect on the long term average signal output by filter 28 as on the instantaneous output of filter 26. Load cell 22 and preamp 24 may therefore be realized by use of relatively inexpensive components. Load cell 22 also may be of relatively low capacity; in a preferred embodiment load cell 22 would have a capacity of 2 lbs. while load cell 12 would have a capacity of 100 lbs. In applications with table top scales, a light reference weight is advantageous, so as to reduce the overall weight of the scale.

Figure 3:
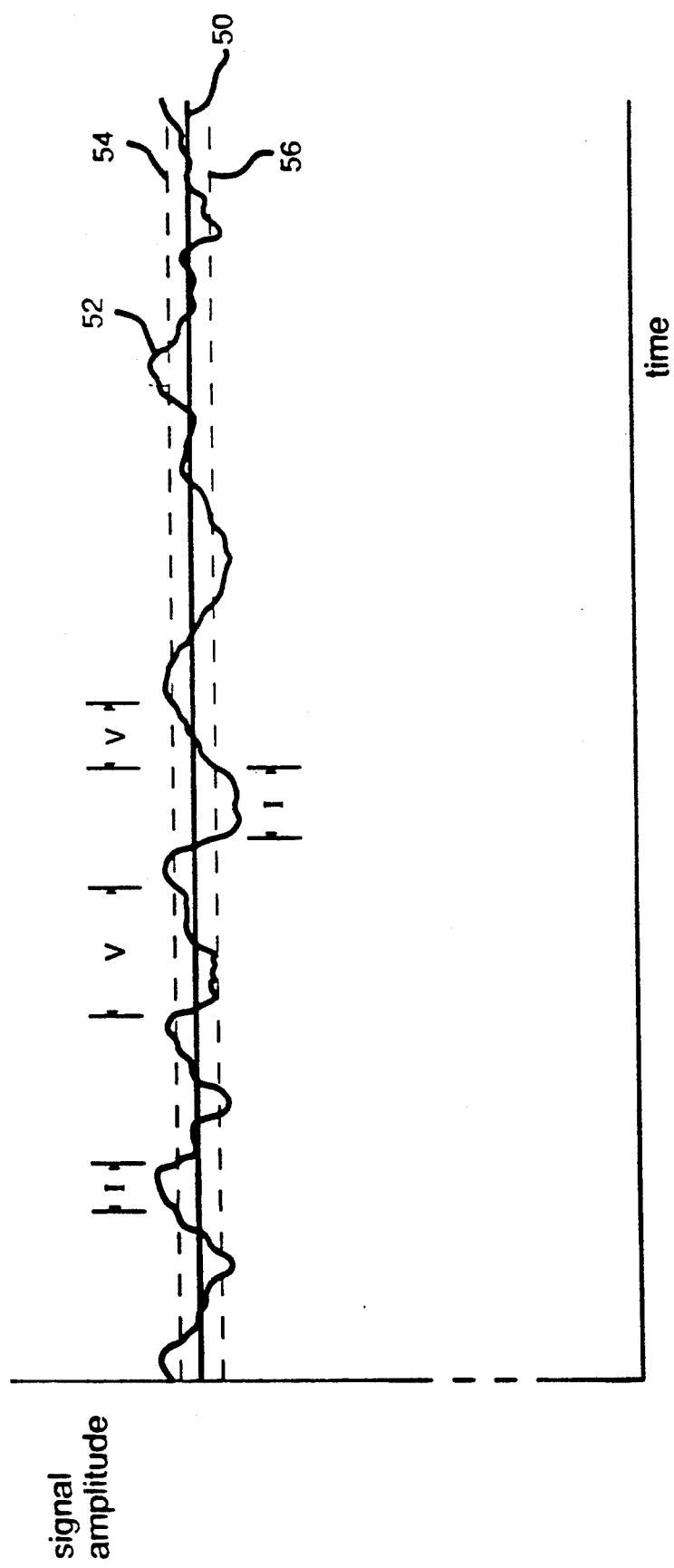
FIG. 3 is a graph of signals compared by the compare module of FIG. 2.

It should be recognized that it may be necessary to trade off the size of the threshold illustrated in FIG. 3 against the desired response time of the scale. While a smaller threshold will provide for a validated weighing channel signal that is less affected by ground vibration, it may also increase the time which passes between intervals V, when a validating signal is generated, particularly if much vibration is present. A further trade-off may need to be made regarding any tendency on the part of load cell 22 towards zero-shift. While exposure to zero shift can be compensated for in the setting of the comparison threshold, this threshold is also subject to constraint by the desired accuracy and response time.

The points made in the preceding two paragraphs are illustrated in more detail by reference to FIGS. 3-A, 3-B, 3-C, 3-D, 3-E, 3-F. FIG. 3-A may be taken to represent an initial condition, i.e. before zero shift, in which a constant reference weight of say 2 lbs. is applied to load cell 22 and is assumed to produce an average signal amplitude output by the reference channel of 200 mv (represented by line 50). As in FIG. 3, dashed lines 54 and 56 define a 0.1% threshold around line 50.

Point A1 represents an instantaneous signal on terminal A produced by vibration that increases the apparent weight on load cell 22 by 0.09%, yielding a signal amplitude of 200.18 mv, which is within the threshold, being less than the level of 200.20 mv represented by line 54. Point A2 represents a second instantaneous signal on terminal A produced by vibration that increases the apparent weight by 0.11%, yielding a signal amplitude of 200.22 which is outside of the threshold. (It will be recognized that the relative spacing of lines 50, 54, 56 and points A1, A2 have been exaggerated for purposes of illustration, as will also be the case for FIGS. 3-B, 3-C, 3-D, 3-E, 3-F.)

It will now be assumed that the reference channel experiences a zero shift of minus 50 mv. As shown in FIG. 3-B, the average signal amplitude represented by line 50 is now at 150 mv. The upper bound of the threshold, represented by dashed line 54 is now at 150.15 mv. However, point A1', representing an apparent weight increased by 0.09%, is at 150.18 mv, which is now outside of the threshold. Point A2', representing an apparent weight increased by 0.11%, is still outside of the threshold, at 150.22 mv. Thus the effect of the zero shift in this case was to shrink the threshold, with an attendant increase in stringency with respect to vibration but also with an increased response time.

Instead of the negative zero shift illustrated in FIG. 3-B, we will now assume a plus 50 mv zero shift, illustrated in FIG. 3-C. Line 50 now represents an average signal amplitude of 250 mv. Dashed line 54 now represent an upper bound of the threshold at 250.25 mv. Point A1'', at 250.18 mv, represents an apparent Weight increased by 0.09%, and is still within the threshold. But point A2'', representing an apparent weight increased by 0.11%, is now within the threshold at 250.22 mv. The positive zero shift causes readings to be validated which would not have been validated prior to the shift. In effect the threshold has been expanded.

Immunity of the reference channel to gain shift is illustrated by reference to FIGS. 3-D, 3-E, 3-F. FIG. 3-D is identical to FIG. 3-A, representing initial conditions before a gain shift.

We now assume that the reference channel experiences a gain shift of −25%. As shown in FIG. 3-E, the average single amplitude represented by line 50 is now at 150 mv. The upper bound of the threshold, line 54, is at 150.15 mv. Point A1', representing an apparent weight increased by 0.09%, is at 150.135 mv, still within the threshold. Point A2', at 150.165 mv, is still outside of the threshold.

If we now assume a gain shift of +25% (FIG. 3-F), line 50 is now at 250 mv and line 54 at 250.25. Point A1'', representing an apparent weight increased by 0.09%, is at 250.225 mv, still within the threshold. Point A2'', at 250.275 mv, is still outside the threshold.

A key point concerning the examples just discussed with reference to FIGS. 3-A, 3-B, 3-C, 3-D, 3-E, 3-F is that the threshold amount was defined as a fixed percentage, in this case 0.1%, of the signal on terminal B, represented by line 50. As we have seen, such a threshold is immune from gain shifts, but is distorted by zero shifts. If one were to set the threshold amount as a fixed quantity, say 0.2 mv, rather than a fixed percentage, the threshold would be immune from zero shifts but would not handle gain shifts appropriately. Thus, for a fixed threshold amount of 0.2 mv, the line 54 of FIG. 3-B would be at 150.2 mv, placing A1' inside the threshold and A2' outside. Similarly in FIG. 3-C, line 54 would be at 250.2 mv, so that A1'' again would be inside and A2'' outside. However, in FIG. 3-E a fixed threshold amount of 0.2 mv would put line 54 at 150.2 mv, leaving both A1, and A2' inside the threshold, while in FIG. 3-F, line 50 would be at 250.2 mv, placing both A1'' and A2'' outside the threshold.

It will therefore be appreciated that selection of either a fixed percentage or a fixed quantity for the threshold amount depends on whether gain shifts or zero shift can be more easily controlled.

Figure 4:
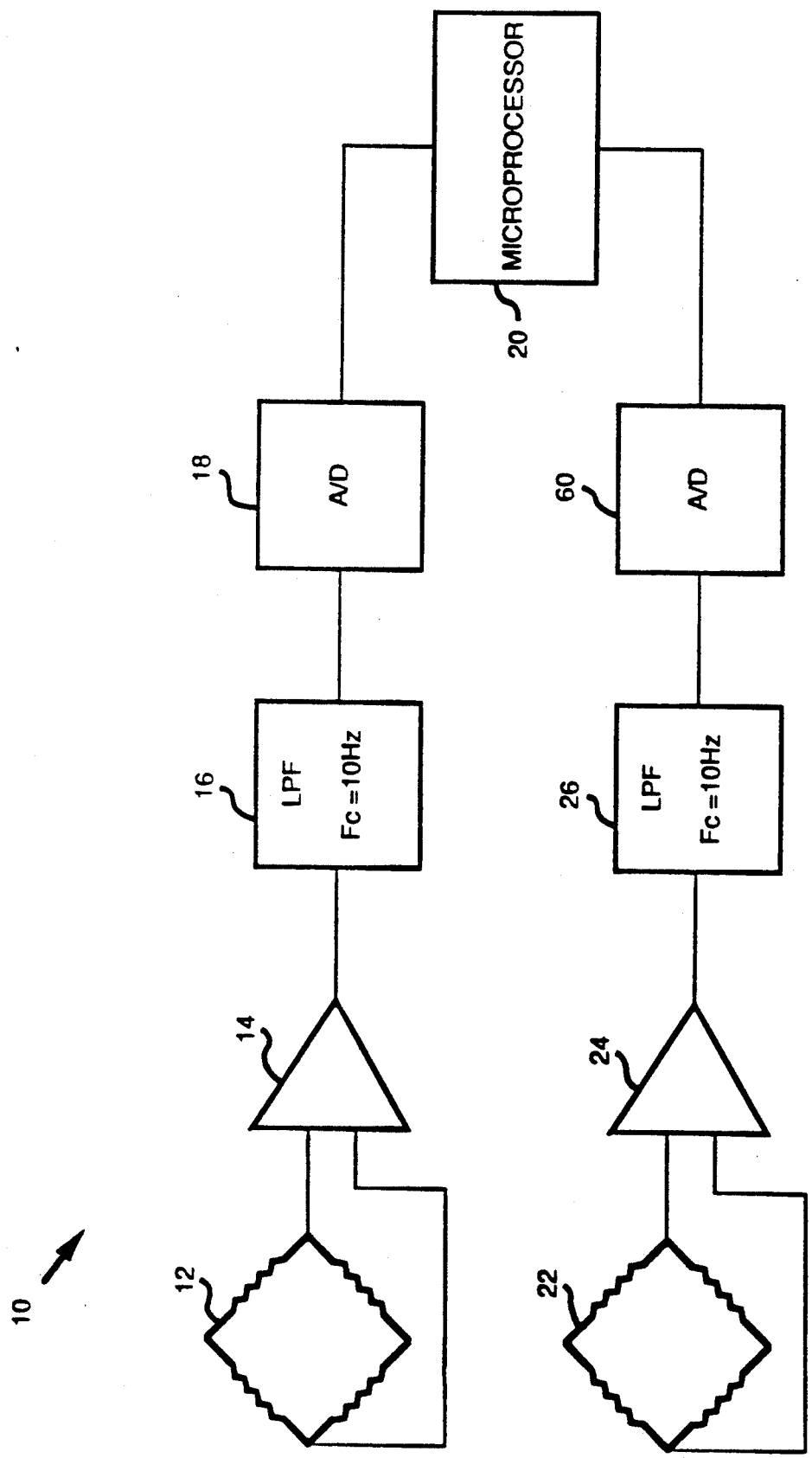
FIG. 4 is a block diagram of another embodiment of a weighing scale in accordance with the invention.

An alternative embodiment of a scale in accordance with the invention is described with reference to FIGS. 4 and 5. As shown in FIG. 4, scale 10' includes load cell 12, preamp 14, low pass filter 16, A/D converter 18 and microprocessor 20, making up a weighing channel like that of scale 10. Similarly, scale 10' includes a reference channel that includes load cell 22, preamp 24 and low pass filter 26, but does not have low cut off frequency filter 28 nor compare module 30 of scale 10. As before, load cells 12 and 22 are mounted so as to be similarly affected by ground vibration. In scale 10', the output of filter 26 is received by A/D converter 60, which in turn provides to microprocessor 20 a digital signal representative of filter 26's output. Filter 26 and A/D converter 60 should be matched to filter 16 and A/D converter 18 so that the output signals of A/D converters 18 and 60 synchronously reflect ground vibrations experienced in common by load cells 12 and 22.

In addition to conventional software routines relating to weight signal processing and the like, microprocessor is programmed to receive the instantaneous output of the reference channel, average it over time, and compare the average with the instantaneous output. A routine to perform these functions is illustrated by FIG. 5.

Figure 5:
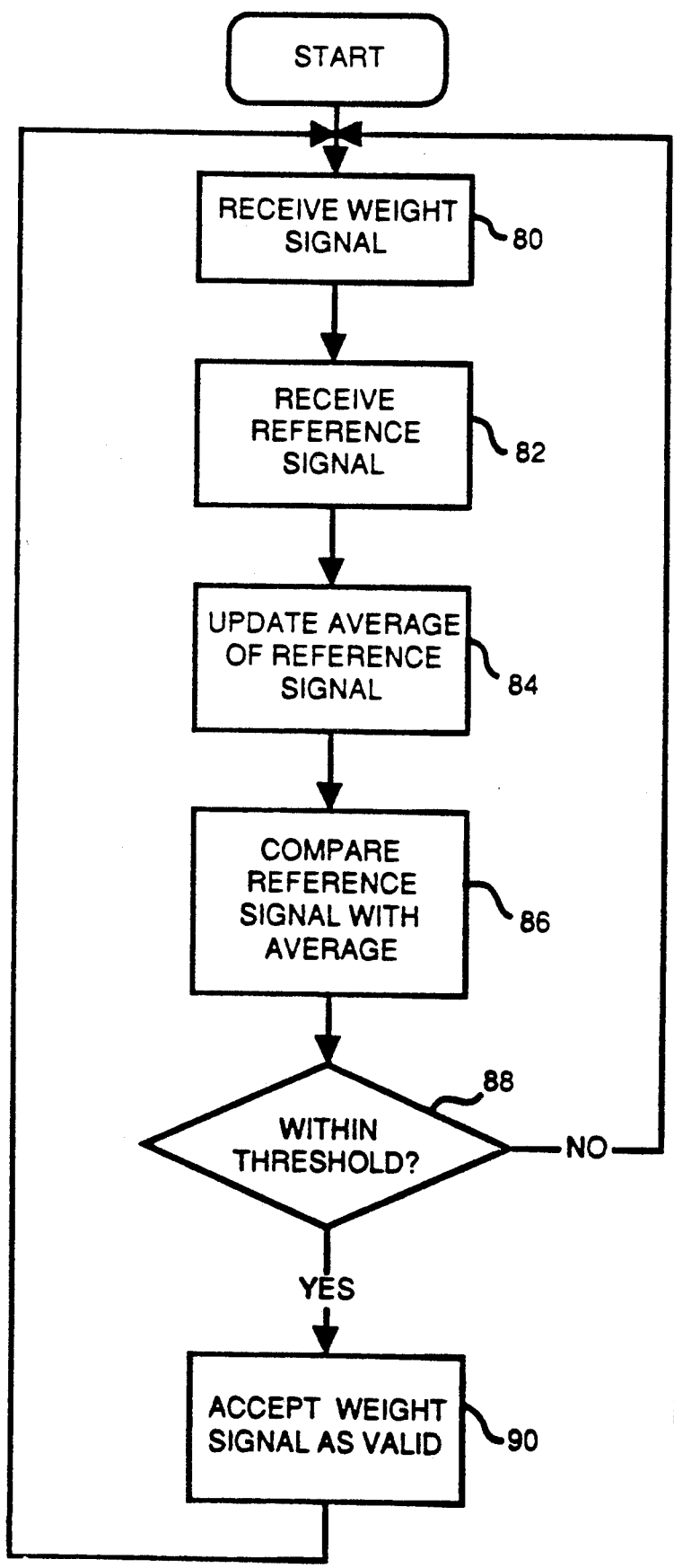
FIG. 5 is a flow chart of a program for operating the scale of FIG. 4.

The routine of FIG. 5 begins with step 80, at which microprocessor 20 receives the weighing channel's signal from A/D converter 18. It will be assumed that pan in motion tests and so forth have been performed and no motion has been found. For example, if scale 10 is used in a system which automatically places an article on the pan, as by means of a conveyor, a certain delay period, such as 300 ms, will occur to allow damping of oscillations caused by placement of the article on the pan. As an alternative, if the article is to be placed manually, a large change in the output of the weighing channel will be assumed to represent placement of an article, again triggering a delay period.

After step 80, microprocessor 20 receives the reference channel's signal from A/D converter 60 (step 82). Next comes step 84, at which microprocessor 20 updates a long term running average of the reference channel on the basis of the reference signal received at step 82. Step 86 follows, at which the reference signal is compared with the updated average. For example, at step 86, it may be determined if the reference signal differs from the average by more than 0.1% of the average. Alternatively, the threshold amount may be a fixed amount rather than a fixed percentage of the average.

In any case, at step 88 the routine branches, depending on the result of step 86. If the reference signal is not within the threshold, the routine cycles again through steps 80, 82, 84 and 86. If the reference signal is within the threshold, step 90 follows, at which microprocessor 20 accepts the weight signal received at step 80 as valid and proceeds to process the signal, display a weight indication, calculate a postal rate, etc. In effect, at step 90 microprocessor provides its own validation signal by, for instance, setting a flag or executing a branch to another routine. After the processing of the validated weight signal, the routine of FIG. 5 returns to steps 80 etc.

Although scale 10' of FIG. 4 is shown as having two A/D converters, it is also within the contemplation of this invention to have the outputs of filters 16 and 26 both connected to a single A/D converter through an appropriate multiplexing device which may be under the control of microprocessor 20.

While the invention has been disclosed and described with reference to a limited number of embodiments it is apparent that variations and modifications may be made therein and it is therefore intended in the following claims to cover each such variation and modification as falls within the true spirit and scope of the invention.

What is claimed is:

1. An electronic scale for weighing an article, comprising:
   a housing;
   weighing channel means disposed within said housing for providing an output indicative of an instantaneous weight of the article;
   reference channel means disposed within said housing for providing an output indicative of instantaneous vibrations affecting the output of said weighing channel means;
   first means connected to said reference channel for providing a first signal indicative of a long term average of said output of said reference channel means;
   second means connected to said first means and said reference channel means for comparing said first signal with said output of said reference channel means and for outputting a validation signal when said output of said reference channel means does not differ by more than a threshold amount from said first signal;
   third means for sampling said weighing channel means output when said second means is outputting said validation signal.

2. The scale of claim 1, wherein said second means comprises:
   first voltage divider means, connected to said first means, for receiving said first signal and providing a divider first signal;
   second voltage divider means, connected to said reference channel means, for receiving the output of said reference channel means and providing a divided output;
   first comparator means, connected to said first voltage divider means and to said reference channel means, for comparing said divided first signal to the output of said reference channel means and providing a first comparison signal;
   second comparator means, connected to said second voltage divider means and to said first means, for comparing said divided output to said first signal and providing a second comparison signal; and
   gating means, connected to said first and second comparator means and responsive to said first and second comparison signals, for providing said validation signal.

3. The scale of claim 2, wherein said gating means is an AND gate.

4. The scale of claim 1, wherein said first means comprises a low pass filter.

5. The scale of claim 4, wherein said low pass filter has a cutoff frequency of 0.1 Hz.

6. The scale of claim 1, wherein said reference channel means comprises a load cell.

7. The scale of claim 1, wherein said weighing channel means comprises a load cell.

8. The scale of claim 1, further comprising a processor connected to said weighing channel means and to said second means, said processor being programmed to receive said output of said weighing channel means and to process said output in response to said validation signal.

9. The scale of claim 8, wherein said first means comprises a low pass filter.

10. The scale of claim 9, wherein said weighing channel means comprises a load cell.

11. The scale of claim 10, wherein said reference channel means comprises a load cell.

12. An electronic scale for weighing an article, comprising:
   weighing channel means for providing a first output indicative of an instantaneous weight of the article;
   reference channel means for providing a second output indicative of instantaneous vibrations affecting the output of said weighing channel means; and
   a processor connected to said weighing channel means and said reference channel means, said processor being programmed to:
   (a) receive said first output;
   (b) receive said second output;
   (c) calculate a long term average of said second output;
   (d) compare said average with said second output; and
   (e) accept said first output as valid if said second output is within a threshold amount of said average.

13. The scale of claim 12, wherein said weighing channel means comprises a load cell.

14. The scale of claim 12, wherein said reference channel means comprises a load cell.

15. The scale of claim 12, wherein said threshold amount is a predetermined percentage of said average.

16. A method of weighing an article by use of an electronic scale, comprising the steps of:
   (a) applying the article to the scale;
   (b) generating a weight signal representative of an instantaneous weight of the applied article;
   (c) generating a reference signal representative of vibrations affecting the scale;
   (d) generating a long term average of the reference signal;
   (e) comparing the reference signal to the long term average; and
   (f) validating the weight signal when the reference signal is within a threshold amount of the long term average.

17. The method of claim 16, wherein step (d) comprises applying the reference signal to a low pass filter having a low cut off frequency.

18. The method of claim 17, wherein the low cut off frequency is about 0.1 Hz.

19. The method of claim 16, wherein the threshold amount is a fixed percentage of the long term average.

20. The method of claim 16, wherein step (f) comprises providing a validation signal.

* * * * *